Dec. 12, 1950        A. TELLIER        2,533,535
EDUCATIONAL APPARATUS
Filed Sept. 17, 1945                                3 Sheets-Sheet 1
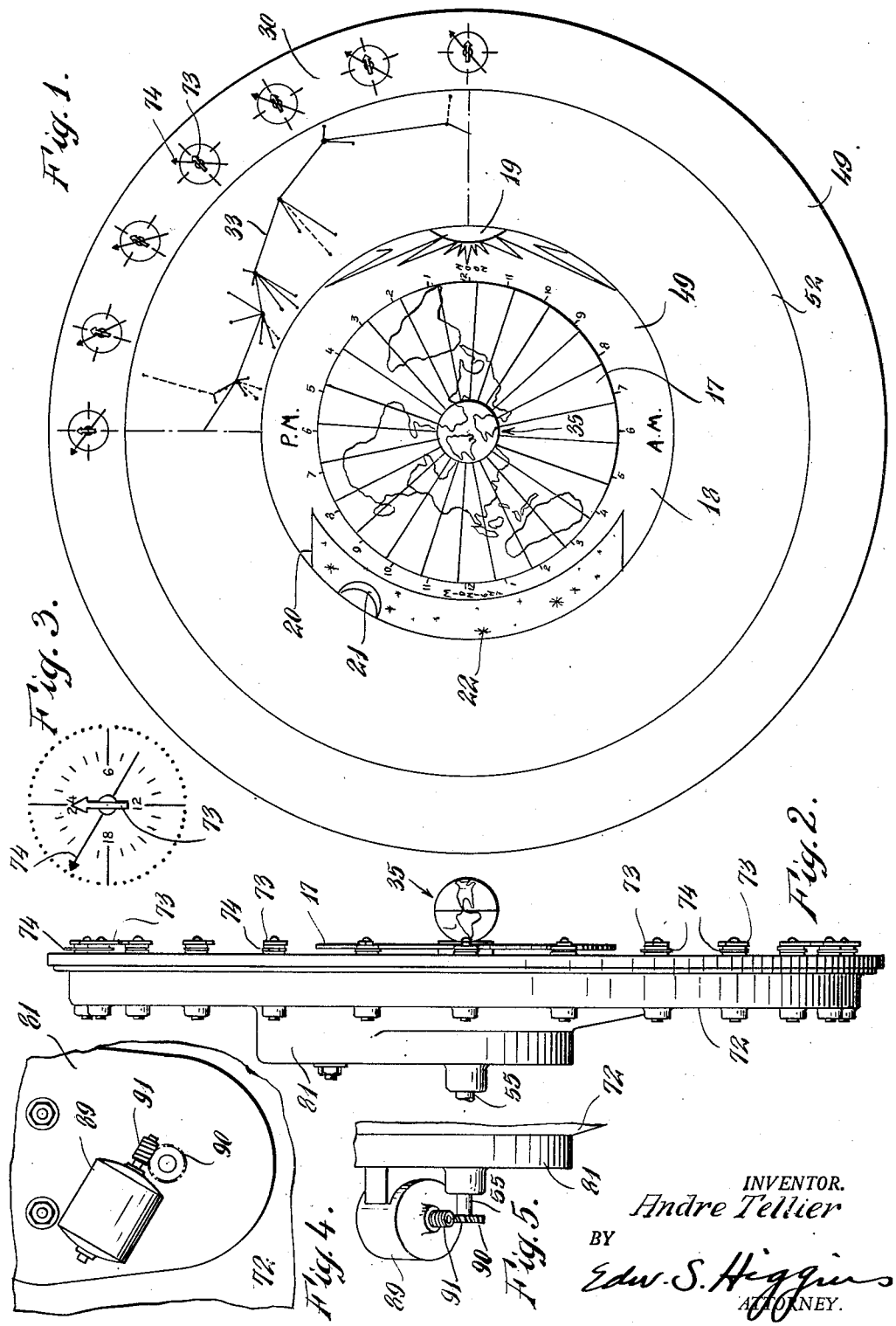
INVENTOR.
Andre Tellier
BY
Edw. S. Higgins
ATTORNEY.

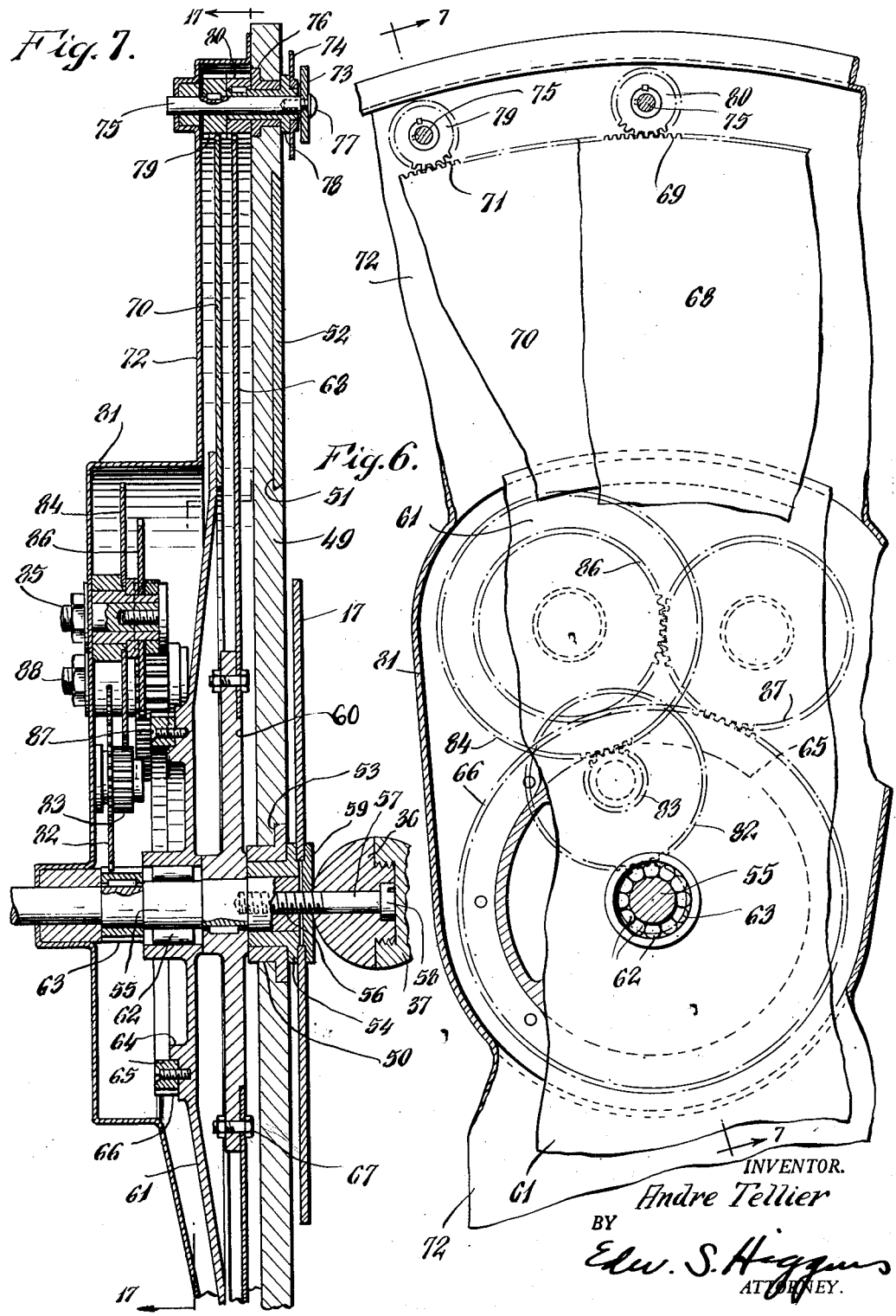

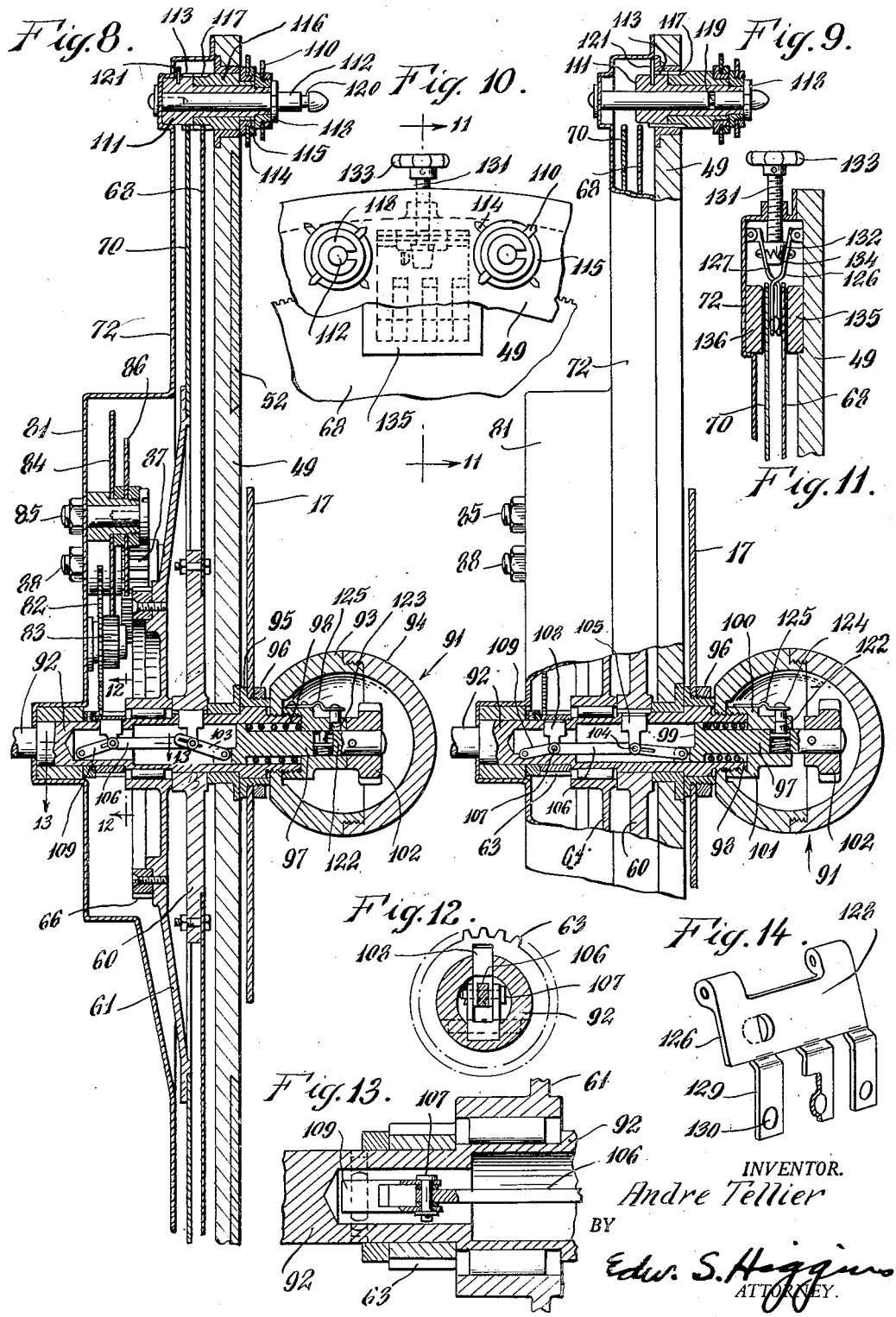
Dec. 12, 1950      A. TELLIER      2,533,535
EDUCATIONAL APPARATUS
Filed Sept. 17, 1945      3 Sheets—Sheet 3
INVENTOR.
Andre Tellier
BY
Edw. S. Higgins
ATTORNEY.

Patented Dec. 12, 1950

2,533,535

UNITED STATES PATENT OFFICE 2,533,535

EDUCATIONAL APPARATUS

Andre Tellier, New York, N. Y.

Application September 17, 1945, Serial No. 616,783

4 Claims. (Cl. 35—44)

This invention relates generally to educational apparatus.

An object of the invention is to provide an apparatus that visibly teaches the relation of the earth's movements to the sun.

Another object is to provide an apparatus that visibly teaches how to reckon time for principal cities lying in the twenty-four time belts according to Navy and standard time, how the seasons of the year are determined and how the phases of the moon are produced.

Another object is to provide such an apparatus that visibly indicates the position of the continents on the earth, the principal cities of the world, the distance between said cities and the main airplane routes between said cities.

Another object is to provide such an apparatus with easily manipulated parts whereby practice is provided in motor and sensory coordination through direct experience.

Another object is to provide such a device that is entertaining as well as instructive.

Other objects and advantage will be apparent from the description of the invention to follow taken in connection with the accompanying drawings in which—

Fig. 1 is a front view of one form of my improved apparatus.

Fig. 2 is an edge view of the form of invention shown in Fig. 1.

Fig. 3 is an enlarged detail view of time devices or clocks of Fig. 1.

Figs. 4 and 6 are enlarged detail views of the motor and connections for driving the movable parts of the apparatus.

Fig. 6 is a fragmentary sectional view on an enlarged scale showing the driving mechanism of the device of Fig. 1, parts being broken away.

Fig. 7 is a sectional view of the mechanism of Fig. 6 taken on the plane of the line 7—7 of Fig. 6.

Fig. 8 is a sectional view similar to Fig. 7 of another modified form of the invention, showing the mechanism for driving the timing devices in operative position.

Fig. 9 is a fragmentary sectional view and elevational view of the mechanism of Fig. 8 in inoperative position.

Fig. 10 is an enlarged detail view of the mechanism for holding the disc wheels from movement.

Fig. 11 is a sectional view taken on the plane of the line 11—11 of Fig. 10.

Fig. 12 is a sectional view taken on the plane of the line 12—12 of Fig. 8.

Fig. 13 is a sectional view taken on the plane of the line 13—13 of Fig. 8.

Fig. 14 is a detail perspective view of one of the clamping devices shown in Fig. 10.

Referring to the form of my invention shown in Figs. 1 to 7, inclusive, a circular disc member 49 of wood or other suitable material is provided with a central opening 50 and an annular groove 51 in its front face for receiving an annular member 52 of the same material. Positioned in the opening 50 is a bushing 53 supporting an inner sleeve 54 and extending through said sleeve rearwardly of the disc member is a shaft 55. The front end of the shaft is provided with an axial screw threaded bore 56 for receiving a screw threaded bolt 57 with an enlarged head 58. A globe 35 is rotatably mounted on the bolt, and clamped between the sleeve member 54 and a washer 59 by means of said globe on the bolt 57 is a transparent disc 17. This disc covers the front face of the disc member 49 to a point remote from the inner periphery of the annular member 52 leaving a space 18 between their adjacent peripheries.

Keyed to the shaft 55 rearwardly of the disc member 49 for rotation with said shaft is a disc member 60 and rotatably mounted on said shaft rearwardly of the disc member 60 is another disc member 61. This disc member 61 rotates on roller bearings 62 positioned between the shaft and hub of the disc. Keyed to the shaft rearwardly of the disc 61 is a spur gear 63. Disc member 61 is provided with an annular enlarged portion 64 for supporting a ring member 65 having teeth 66 on its outer periphery. Fastened to the disc member 60 by bolts 67 is a disc wheel 68 provided with teeth 69 on its outer periphery. Another disc wheel 70 is fastened to the disc member 61 by welding or other suitable means and this wheel is provided with teeth 71 on its outer periphery. A cover 72 is fastened on the rear surface of the disc member 49.

At spaced intervals adjacent the outer periphery of disc member 49 are timing devices including an hour hand 73 and a minute hand 74 operatively engaged with the disc wheels 70 and 68, respectively. Each timing device includes a stub shaft 75 extending through a bushing 76 in an opening in the disc member 49 adjacent its periphery and rearwardly through the cover member 72. The hour hand 73 is fastened to the outer end of the shaft 75 by a bolt 77 and the minute hand is wedged on to the outer end of a sleeve member 78 rotatably mounted on shaft 75. Keyed to shaft 75 in alignment and continuous mesh with the teeth of disc wheel 70 is a spur gear 79, and a similar spur gear 80 is keyed to the sleeve member 78 in alignment and continuous mesh with the teeth of disc wheel 68.

It is necessary that the minute hand 74 move twenty-four times faster than the hour hand 73. This is accomplished by the gearing housed in an offset portion 81 of the cover 72. This gearing comprises a toothed wheel 82 suitably secured to the cover and having a broad faced spur gear 83 on its hub. Another toothed wheel 84 is suitably mounted on a stub shaft 85 on the cover in continuous mesh with the spur gear 83 and is driven thereby. On the same shaft is another toothed wheel 86 spaced from but turnable with toothed wheel 84. Toothed wheel 86 is in mesh with a broad faced gear 87 supported on a shaft 88 on the cover, and drives said gear 87. Gear 87 is in mesh with the teeth 66 on the gear ring 65. It will be seen that when the globe is turned manually for adjusting or other purpose the drive is brought from the shaft 55 directly to disc member 17 and disc wheel 68 and from said wheel to the minute hand 74, but that said drive is transmitted to the disc member 61 and disc wheel 70 through the gear 63 and gearing in the offset portion of the cover and from the disc wheel 70 to the shaft 75 and hour hand 73. The gearing is so constructed and arranged that the hour hand 73 moves twenty-four times slower than the minute hand.

The shaft 55 may be driven by a motor 89 as shown in Figs. 4 and 5. In such case, the shaft is provided with a worm wheel 90 on its outer end which is in mesh with the worm drive shaft 91 of the motor. Means may be provided for disconnecting the shaft 55 from the motor when the shaft is to be turned manually.

In the form of the inventions shown in Figs. 8 to 14, inclusive, the globe 91, transparent disc 17 and the hour and minute hands of the timing devices may move simultaneously and in unison as in the form of the invention shown in Figs. 1 to 7, inclusive, or the transparent disc member and globe may move independently or separately of the hour and minute hands. This is accomplished by providing mechanism for disconnecting disc wheels 68 and 70 from the drive shaft 92. In this form of the invention, the drive shaft 92 is hollow or tubular. On the outer end of the shaft is the globe or hollow spherical member 91 having inner and outer complementary members 93 and 94, the inner member being screw threaded to the shaft 92 and the outer member threaded to the inner member. Transparent disc 17 is threaded on the shaft between the flange of a sleeve member 95 and a washer 96. Slidable in the outer end of the shaft 92 is a plunger 97 normally pressed inwardly by a spring 98 which has one end seated on a flange 99 on the inner end of the plunger and its other end seated against a shoulder 100 on the sleeve member 101 which is threaded on to the shaft 92 and forming an extension thereof. A knob or handle 102 is fastened to the outer end of the plunger for actuating the same. A lever or link member 103 is positioned in the hollow shaft 92 and has one end pivotally connected to the inner end of the plunger and its other end is slotted and slidably connected to a pin 104 supporting a key member 105 extending through an opening in the shaft 92 in alignment with the hub portion of disc member 60, which key member is adapted to engage a keyway in said hub portion. Another link member 106 has one end connected to the pin 104 and its other end connected to a similar pin 107 supporting a key member 108 extending through an opening in the shaft 92 in alignment with the spur gear 63 and adapted to be engaged in a keyway in the hub portion of said gear. A link member 109 similar to link member 103 has one end slidably connected to the key member 108 and its other end pivotally connected to the inner wall of the hollow shaft 92. In Fig. 8, the key members 105 and 108 are shown in driving position in the keyways of the disc member 60 and gear 63 and rotation of the shaft 92 manually or by motor will be imparted to said disc member and gear. The toggle action of the linkage causes the key members 105 and 108 to move into and out of the keyways.

In this form of the invention, the hour hand 110 is fastened to an elongated sleeve member 111 rotatable and slidable on a stub shaft 112 supported by the disc member 49 and the cover 72. Gear teeth 113 are formed on said sleeve member 111 adapted to mesh with the peripheral teeth of disc wheel 70 whereby said sleeve member and hour hand are rotated.

The minute hand 114 is supported by a washer member 115 fastened to a sleeve member 116 rotatable on the sleeve member 111. Sleeve member 116 is formed with gear teeth 117 adapted to mesh with the peripheral teeth of disc wheel 68 whereby said sleeve member 116 and minute hand are rotated. Sleeve members 111 and 116 are adapted to slide in unison on the shaft 112. In Fig. 8, the disc wheels and gear teeth are shown in operative position. In Fig. 9, said disc wheels and gear teeth are shown separated in inoperative position. This is accomplished by first removing a washer member 118 which is removably mounted in an inner peripheral groove 119 in the shaft 112 and sliding the sleeve members 111 and 116 outwardly on the shaft to the position of Fig. 9. The removed washer is then mounted in an outer groove 120 on the stub shaft. A pin 121 on the sleeve 111 acts as a stop to limit the outward movement of the parts. To restore the parts to operative position, the movable parts are slid inwardly to innermost position and the washer 118 is again mounted in the inner groove 119.

In Fig. 9, the disc member 60 and the gear 63 are also shown disconnected from the drive shaft 92. This is done by first removing the outer section 94 of the globe and then pulling out the plunger 97 by means of the handle or knob 102 against the action of spring 98 and because of the toggle action of the linkage supporting the key members 105 and 108, said key members are pulled out of the keyways on disc 60 and gear 63, respectively. The parts are held in disconnected position by a spring pressed pin plunger 122 adapted to move into an opening or socket 123 formed in the sleeve member 101. In order to release the holding plunger 122 to permit the spring 98 to move the plunger inwardly to position to connect the parts with the drive shaft 92, I have provided a movable pin 124 carried by a flat spring 125. The pin 124 is in alignment with and is adapted to engage plunger pin 122 and force it outwardly of the socket member.

In order to permit the key members 105 and 108 to return to their respective keyways in the disc member 60 and gear 63, the disc wheels 68 and 70 must be held so that their keyways are in alignment. This is done by the mechanism shown in Figs. 10 and 11.

At a point along the periphery of the disc member 49, between one pair of adjacent timing devices, a pair of shoe members 126 and 127 are pivotally connected to the inner surface of the disc member 49 and the inner surface of the cover 72, respectively, as shown in Fig. 11. Each shoe comprises a flat body portion 128 with offset spaced fingers 129, each finger having a pressed out protuberance 130. When the shoe members are in operative position, the fingers on the shoe member 126 extend through the slots between the fingers on the shoe member 127. The finger members are positioned between the upper edges of the disc wheels 68 and 70. Extending through an opening in the cover 72 in alignment with the shoe members is a screw threaded shaft 131 with a wedge-shaped head 132 on its inner end and an actuating handle 133 on its outer end. The wedge-shaped head is positioned between and in engagement with the flat body portions of the shoe members. A spring 134 holds the shoes 126 and 127 normally together. Upon inward movement of the shaft, the finger members will be spread apart and the protuberances thereon will clampingly press the disc wheels 68 and 70 between said fingers and brake shoes 135 and 136 mounted on shouldered portions of the disc member 49 and cover 72 to hold said wheels against movement. This holds the wheels in the same relative position and keeps the keyways in the disc member 60 and the gear 63 in alignment.

The improved apparatus may be supported by means of brackets clamped to the bottom of the member 49 or in any other suitable manner.

I claim:

1. An educational apparatus including a disc member having an annular portion with representations of various cities of the world on one surface thereof and having lines representing air routes between said cities, timing devices spaced annularly around said disc member adjacent the outer periphery of said disc member, each timing device including a shaft, an hour hand on said shaft and a minute hand on said shaft, a hollow rotatable shaft extending through the center of said disc member, a transparent disc fixed on the central hollow shaft adjacent one face of said disc member inwardly of said annular portion, said transparent disc having a representation of a map on one surface thereof, mechanism for simultaneously rotating said shafts including a motor operatively connected to the hollow central shaft, a pair of independently movable disc wheels operatively connected to said hollow shaft, intermeshing gears on said wheels and on the shaft supporting the hour and minutes hands of each timing device, linkage in said hollow shaft connected to the operative connection between the shaft and disc wheels and a manually operated plunger adapted to move said linkage for breaking said operative connection between said shaft and disc wheels.

2. An educational apparatus including a disc member having an annular portion with representations of various cities of the world on one surface thereof and having lines representing air routes between said cities, timing devices spaced annularly around said disc member adjacent the outer periphery of said disc member, each timing device including a shaft, an hour hand on said shaft and a minute hand on said shaft, a hollow rotatable shaft extending through the center of said disc member, a transparent disc fixed on the central hollow shaft adjacent one face of said disc member inwardly of said annular portion, said transparent disc having a representation of a map on one surface thereof, mechanism for simultaneously rotating said shafts including a motor operatively connected to the hollow central shaft, a pair of independently movable disc wheels operatively connected to said hollow central shaft, intermeshing gears on said wheels and on the shaft supporting the hour and minute hands of each timing device, linkage in said hollow central shaft connected to the operative connection between the shaft and disc wheels, a manually operated plunger adapted to move said linkage for breaking said operative connection between said shaft and disc wheels and means for holding said linkage in moved position.

3. An educational apparatus including a disc member having an annular portion with representations of various cities of the world on one surface thereof and having lines representing air routes between said cities, timing devices spaced annularly around said disc member adjacent the outer periphery of said disc member, each timing device including a shaft, an hour hand on said shaft and a minute hand on said shaft, a hollow rotatable shaft extending through the center of said disc member, a transparent disc fixed on the central hollow shaft adjacent one face of said disc member inwardly of said annular portion, said transparent disc having a representation of a map on one surface thereof, mechanism for simultaneously rotating said shafts including a motor operatively connected to the hollow central shaft, a pair of independently movable disc wheels operatively connected to said hollow central shaft, intermeshing gears on said wheels and on the shaft supporting the hour and minute hands of each timing device, linkage in said hollow central shaft connected to the operative connection between the shaft and disc wheels, a manually operated plunger adapted to move said linkage for breaking said operative connection between said shaft and disc wheels and means for holding said linkage in moved position including a socket, an extension on said shaft having a socket and a spring pressed pin on said plunger adapted to move into said socket to hold the linkage in moved position.

4. An educational apparatus including a disc member having an annular portion with representations of various cities of the world on one surface thereof and having lines representing air routes between said cities, timing devices spaced annularly around said disc member adjacent the outer periphery of said disc member, each timing device including a shaft, an hour hand on said shaft and a minute hand on said shaft, a hollow rotatable shaft extending through the center of said disc member, a transparent disc fixed on the central hollow shaft adjacent one face of said disc member inwardly of said annular portion, said transparent disc having a representation of a map on one surface thereof, mechanism for simultaneously rotating said shafts including a motor operatively connected to the hollow central shaft, a pair of independently movable disc wheels operatively connected to said hollow central shaft, intermeshing gears on said wheels and on the shaft supporting the hour and minute hands of each timing device and mechanism for holding the disc wheels against relative movement including spring-pressed opposed wedging shoes disposed between the surfaces of said disc wheels adjacent the outer peripheries of said disc wheels and a manually operable wedging member for spreading said shoes against said surfaces in braking relationship.

ANDRE TELLIER.

REFERENCES CITED

The following references are of record in the file of this patent:

UNITED STATES PATENTS

| Number | Name | Date |
|---|---|---|
| 497,917 | Gleason | May 23, 1893 |
| 556,486 | Yaggy | Mar. 17, 1896 |
| 615,098 | Nichols | Nov. 29, 1898 |
| 792,336 | Lewis | June 13, 1905 |
| 876,948 | Dexter | Jan. 21, 1908 |
| 1,045,304 | Luporini | Nov. 26, 1912 |
| 1,141,070 | Miller | May 25, 1915 |
| 1,419,604 | Beckley | June 13, 1922 |
| 1,438,153 | Whalen | Dec. 5, 1922 |
| 1,814,984 | Vanderhider | July 14, 1931 |
| 1,912,305 | Phillips | May 30, 1933 |
| 2,105,563 | Thomas | Jan. 18, 1938 |
| 2,172,450 | Pitcher | Sept. 12, 1939 |